(12) United States Patent
Sato et al.

(10) Patent No.: US 6,678,019 B2
(45) Date of Patent: Jan. 13, 2004

(54) LCD INCLUDING LIGHT DIVERGENT ELEMENT AT FRONT OF DISPLAY PANEL

(75) Inventors: Takashi Sato, Tenri (JP); Noriko Watanabe, Nara (JP); Shigeaki Mizushima, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/956,941

(22) Filed: Sep. 21, 2001

(65) Prior Publication Data

US 2003/0053009 A1 Mar. 20, 2003

(30) Foreign Application Priority Data

Sep. 27, 2000 (JP) .......................... 2000-293470

(51) Int. Cl.$^7$ .................. G02F 1/1335; G02B 27/10; G02B 6/10
(52) U.S. Cl. .................. 349/57; 359/628; 385/146
(58) Field of Search .................. 349/57; 359/628; 385/146

(56) References Cited

U.S. PATENT DOCUMENTS

| | | | |
|---|---|---|---|
| 5,467,208 A | * 11/1995 | Kokawa et al. | 349/67 |
| 5,704,703 A | * 1/1998 | Yamada et al. | 362/27 |
| 5,771,328 A | * 6/1998 | Wortman et al. | 385/146 |
| 5,917,664 A | * 6/1999 | O'Neill et al. | 359/831 |
| 6,166,787 A | * 12/2000 | Akins et al. | 349/57 |
| 6,456,437 B1 | * 9/2002 | Lea et al. | 359/625 |

FOREIGN PATENT DOCUMENTS

| | | |
|---|---|---|
| JP | 7-120743 A | 5/1995 |
| JP | 8-201796 A | 8/1996 |
| JP | 9-127309 | 5/1997 |
| JP | 10-104433 | 4/1998 |

* cited by examiner

*Primary Examiner*—Tarifur R. Chowdhury
(74) *Attorney, Agent, or Firm*—Nixon, Vanderhye P.C.

(57) ABSTRACT

A transmission type liquid crystal display device includes: a liquid crystal display element including a pair of transparent insulating substrates placed to face each other with a gap therebetween, transparent electrodes being formed on inner surfaces of the substrates, and a liquid crystal material injected in the gap; a light source placed on a back side of the liquid crystal display element; and a light diverging element placed on a front side of the liquid crystal display element, wherein the liquid crystal display device satisfies an expression $$0.5 \leq \frac{\int_{-90°}^{90°} BL(\theta) \times LC(\theta) \times \mathrm{Dif}(10°, \theta) d\theta}{\int_{-90°}^{90°} BL(\theta) \times LC(\theta) \times \mathrm{Dif}(0°, \theta) d\theta}$$

where $BL(\theta)$ is a light emitting angle $\theta$—luminance characteristic of the light source, $LC(\theta)$ is an incident angle $\theta$ to the liquid crystal display element—transmittance characteristic of the liquid crystal display element in a bright state, and $\mathrm{Dif}(a, \theta)$ is an incident angle $\theta$ to the light diverging element—transmittance characteristic of the light diverging element at a light receiving angle a.

11 Claims, 8 Drawing Sheets

LCD INCLUDING LIGHT DIVERGENT ELEMENT AT FRONT OF DISPLAY PANEL

BACKGROUND OF THE INVENTION

1. Field of the Invention

The present invention relates to a liquid crystal display device and a lens sheet used for the liquid crystal display device, and in particular, relates to a direct-view type liquid crystal display device used for office automation (OA) equipment such as word processors and notebook personal computers, various video-related equipment, game machines, TV receivers, and the like, and a lens sheet used for such a liquid crystal display device.

2. Description of Related Art

Conventionally, CRTs were often used as displays for personal computers, word processors, TV receivers, and the like. In recent years, with the demands for reduction in the size, thickness, and weight of these electronic apparatus, flat-panel displays have been increasingly used. Some types of flat-panel displays have been developed. Among these, liquid crystal display devices, which have advantages such as low power consumption, have found broad application.

A liquid crystal display device displays an image by applying an electric field to or passing a current through arbitrary display units of the display device to change light transmittance or reflectivity of the display units, utilizing electrooptic effects, including optical anisotropy (refractive index anisotropy), orientation property, flowability, and dielectric anisotropy, of liquid crystal molecules. Liquid crystal display devices are classified into direct-view type display devices permitting direct observation of an image displayed on the display devices and projection type display devices where an image is projected on a screen from the front or the back and the projected image is observed.

Direct-view type display devices have various display modes, such as a dynamic scattering mode, a twisted nematic mode, a super-twisted nematic mode, a polymer dispersion mode, a ferroelectric liquid crystal mode, a homeotropic mode, and a guest-host mode. As for driving of the direct-view type display devices, there have been developed driving schemes such as segment driving, simple matrix driving, and active matrix driving. Among these modes and driving schemes, the twisted nematic mode in the segment driving is often adopted when the number of display units is small, and the super-twisted nematic mode in the simple matrix driving is often adopted when the number of display units is large.

Liquid crystal display devices display information such as characters and graphics. In recent years, with the demands for increase in the capacity of display contents, a so-called dot matrix display style is often adopted, where minute display units are arranged in rows and columns for display of arbitrary information.

A direct-view type liquid crystal display device is constructed of a liquid crystal cell having an optical shutter function as a core in combination with a back light source for illumination from the back, a reflection prevention film for preventing the front surface from reflecting external light, and the like, as required.

There have been proposed techniques for minimizing the change in display quality with the direction in which a liquid crystal display device is viewed and widening the viewing angle that provides good display quality. These techniques are roughly classified into two: methods where the construction inside the liquid crystal display cell is improved and methods where the construction outside the liquid crystal display cell is improved. Examples of the former methods include: a method where liquid crystal molecules are modified; a method where the placement of polarizing elements, the orientation direction of liquid crystal molecules, and the like are optimized; a method where a plurality of films having birefringence are placed inside the liquid crystal display device; a method where minute concave and convex portions are formed in a substrate; and a method where the driving scheme is optimized. An example of the latter methods is a method where the liquid crystal display cell is combined with a lens, an element for controlling the light transmission direction, or the like.

As the method for widening the viewing angle by combining the liquid crystal display cell with a light diverging element such as a lens for controlling the light transmission direction placed on the viewer's side of the liquid crystal display cell, the following methods are known. One is disclosed in Japanese Laid-Open Patent Publication No. 8-201796, where blurring of an image due to existence of a lens is reduced by appropriately setting the light directivity of a back light source, the distance between a liquid crystal layer and minute unit lenses, and the pitch of display units of the liquid crystal cell in the direction of the array of the minute unit lenses. The other method is disclosed in Japanese Laid-Open Patent Publication No. 7-120743, where reflection of external light from lenses is reduced by appropriately setting the height of the lenses, the pitch of the lenses, and the width of attached portions in the case that a liquid crystal display cell and lens convex portions are attached together via an adhesive or an adhesive layer.

The above conventional methods have the following problems. In Japanese Laid-Open Patent Publication No. 8-201796, it is disclosed that blurring of an image can be made unrecognizable by increasing the pitch of the display units in the column, reducing the distance between the liquid crystal layer and the minute unit lenses, and enhancing the light directivity of the back light source. However, no disclosure is made on the characteristics of the minute unit lenses. Therefore, when this technique is employed and the light directivity of the back light source is enhanced, if the minute unit lenses have distortion in the optical characteristic, such distortion in the viewing angle characteristic of the display is reflected, failing to obtain satisfactory display characteristics. For example, even if minute unit lenses having the most idealistic optical characteristics are successfully produced, the lenses must be attached to a liquid crystal display element via an adhesive layer. In this attachment, the contact state between the adhesive layer and the lenses is easily changed, and thus the minute unit lenses are inevitably distorted in the optical characteristics. The reason is that since the refractive index of the adhesive layer is roughly the same as that of the lenses, the tip portions of the minute unit lenses buried in the adhesive layer no more function normally as lenses. In this occasion, if the light directivity of the back light source is high, the distortion in the optical characteristics of the minute unit lenses influences the display characteristics of the liquid crystal display device.

According to the technique disclosed in Japanese Laid-Open Patent Publication No. 7-120743, no distortion will occur in the lens optical characteristics even when the light directivity of the back light source is high. However, in reality, in order to achieve distortion-free lens optical characteristics according to the technique disclosed in this literature, the ratio of the lens pitch to the width of attached portions must be 5 or more. It is very difficult to control the width of attached portions to attain this construction.

An object of the present invention is to provide a liquid crystal display device having a wide viewing angle and high display quality while using a light source with high directivity, and a lens sheet used for the liquid crystal display device.

SUMMARY OF THE INVENTION

The transmission type liquid crystal display device of the present invention includes: a liquid crystal display element including a pair of transparent insulating substrates placed to face each other with a gap therebetween, transparent electrodes being formed on inner surfaces of the substrates, and a liquid crystal material injected in the gap; a light source placed on the back side of the liquid crystal display element; and a light diverging element placed on the front side of the liquid crystal display element. The liquid crystal display device is designed so as to satisfy an expression $$0.5 \leq \frac{\int_{-90°}^{90°} BL(\theta) \times LC(\theta) \times \mathrm{Dif}(10°, \theta) d\theta}{\int_{-90°}^{90°} BL(\theta) \times LC(\theta) \times \mathrm{Dif}(0°, \theta) d\theta}$$

where $BL(\theta)$ is a light emitting angle $\theta$—luminance characteristic of the light source, that is, a luminance of the light source as a function of a light emitting angle $\theta$, $LC(\theta)$ is an incident angle $\theta$ to the liquid crystal display element—transmittance characteristic of the liquid crystal display element in a bright state, that is, a transmittance of the liquid crystal display element as a function of an incident angle $\theta$, and $\mathrm{Dif}(a, \theta)$ is an incident angle $\theta$ to the light diverging element—transmittance characteristic of the light diverging element at a light receiving angle a, that is, a transmittance of the light diverging element as functions of a light receiving angle a and the incident angle $\theta$.

The expression may be satisfied by adjusting the $BL(\theta)$ and the $\mathrm{Dif}(a, \theta)$.

In a preferred embodiment, an adhesive layer is formed between the light diverging element and the liquid crystal display element, the light diverging element is a lens sheet including first unit lens portions with convex portions having a first height and second unit lens portions with convex portions having a second height smaller than the first height, the lens sheet is attached to the adhesive layer at the first unit lens portions.

In a preferred embodiment, the first unit lens portions of the lens sheet are attached to the adhesive layer, while the second unit lens portions are away from the adhesive layer, and the lens sheet has an optical characteristic of $\mathrm{Dif}(a, \theta) = n \times g(a, \theta) + (1-n) \times f(a, \theta)$ where $g(a, \theta)$ is an optical characteristic of the first unit lens portions, n is a proportion in area of the first unit lens portions to an entire lens sheet, $f(a, \theta)$ is an optical characteristic of the second unit lens portions, and $1-n$ is a proportion in area of the second unit lens portions to the entire lens sheet.

In a preferred embodiment, the light source has directivity that a light emitting angle at which a luminance is a half of the luminance in a direction normal to a front surface of the liquid crystal display element is 15° or less.

In a preferred embodiment, the light source has directivity that a light emitting angle at which a luminance is a half of the luminance in the direction normal to the front surface of the liquid crystal display element is 5° or less, and the light diverging element has an optical characteristic that $\mathrm{Dif}(0°, 10°)/\mathrm{Dif}(0°, 0°)$ is 0.4 or more.

A transmission type liquid crystal display device of the present invention includes: a liquid crystal display element including a pair of transparent insulating substrates placed to face each other with a gap therebetween, transparent electrodes being formed on inner surfaces of the substrates, and a liquid crystal material injected in the gap; a light source placed on a back side of the liquid crystal display element; and a lens sheet placed on a front side of the liquid crystal display element via an adhesive layer. The lens sheet includes: first unit lens portions with convex portions having a first height, and second unit lens portions with convex portions having a second height smaller than the first height, wherein both of the convex portions having the first height and the convex portions having the second height face the adhesive layer, the first unit lens portions are attached to the adhesive layer, while the second unit are away from the adhesive layer.

In a preferred embodiment, a ratio of the second height to the first height is 3/5 and a proportion in area of the first unit lens portions to an entire lens sheet is about 0.2.

In a preferred embodiment, the light source has directivity that a light emitting angle at which a luminance is a half of the luminance in a direction normal to a front surface of the liquid crystal display element is 15° or less.

In a preferred embodiment, the light source has directivity that a light emitting angle at which a luminance is a half of the luminance in the direction normal to the front surface of the liquid crystal display element is 5° or less, and the lens sheet has an optical characteristic that $\mathrm{Dif}(0°, 10°)/\mathrm{Dif}(0°, 0°)$ is 0.4 or more when $\mathrm{Dif}(a, \theta)$ is an incident angle $\theta$ to the lens sheet—transmittance characteristic of the lens sheet at a light receiving angle a.

A lens sheet of the present invention is attached to a front side of a liquid crystal display element via an adhesive layer. The lens sheet includes: first unit lens portions with convex portions having a first height, and second unit lens portions with convex portions having a second height smaller than the first height, wherein both of the convex portions having the first height and the convex portions having the second height face the adhesive layer.

The lens sheet preferably has an optical characteristic that $\mathrm{Dif}(0°, 10°)/\mathrm{Dif}(0°, 0°)$ is 0.4 or more when $\mathrm{Dif}(a, \theta)$ is an incident angle $\theta$ to the lens sheet—transmittance characteristic of the lens sheet at a light receiving angle a.

In a preferred embodiment, a ratio of the second height to the first height is 3/5 and a proportion in area of the first unit lens portions to an entire lens sheet is about 0.2.

DETAILED DESCRIPTION OF THE INVENTION

First, the basic principle of the present invention will be described with reference to the relevant drawings.

Figure 1:
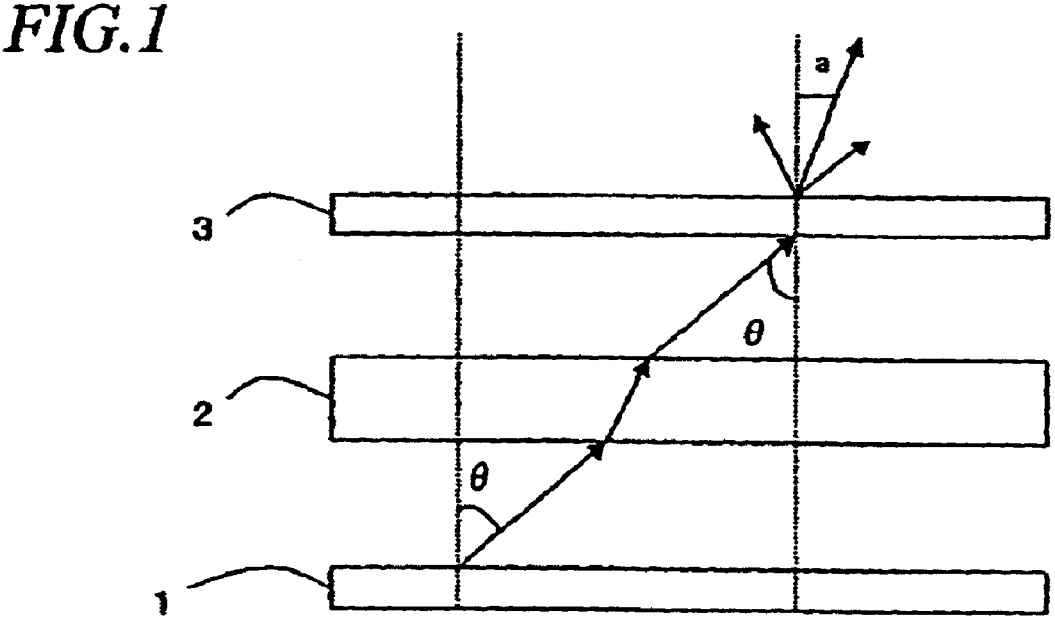
FIG. 1 is an illustration of an outgoing optical path through a back light source, a liquid crystal display element, and a light diverging element.

As shown in FIG. 1, light emitted from a back light source 1 at a light emitting angle θ is incident on a liquid crystal display element 2 at an incident angle θ, passes through the liquid crystal display element 2, and is emitted (i.e., outgoing) at a light emitting angle θ. The light is then incident on a light diverging element 3 at an incident angle θ. This light incident on the light diverging element 3 at the incident angle θ then passes therethrough at various angles. Assume that the ratio in intensity of the light incident on the light diverging element 3 at the incident angle θ to the light emitted from the light diverging element 3 at a light emitting angle a is Dif(a, θ) and that the transmittance characteristic of the liquid crystal display element 2 for the light at the incident angle θ is LC(θ). Assume also that the luminance characteristic of the back light source 1 for the light at the light emitting angle θ is BL(θ), which is used to represent the directivity of the light source 1.

In the state described above, the luminance observed at a certain angle b can be expressed by $$\text{Luminance } (b) = \int_{-90°}^{90°} BL(\theta) \times LC(\theta) \times \text{Dif}(b, \theta) d\theta$$

That is, an idealistic display device with reduced viewing angle dependence of the luminance is obtained when the ratio of the luminance at an angle (b+10°) to the luminance at the angle b, that is, luminance of emitted panel (b+10°)/luminance of emitted panel (b) is closer to 1. The present inventors evaluated by visual recognition the degree of this ratio at which the display was perceived defective. As a result, it was found that the ratio was desirably 0.5 or more.

In liquid crystal display devices, primary importance is placed on the display characteristics viewed from the front (b=0°) and the neighboring area. In view of this, the present inventors have found that, in order to obtain a liquid crystal display device having preferred display characteristics, the directivity of the back light source 1, the transmittance characteristic of the liquid crystal display element 2, and the optical characteristic of the light diverging element 3 should satisfy the following expression.

$$0.5 \leq \frac{\int_{-90°}^{90°} BL(\theta) \times LC(\theta) \times \text{Dif}(10°, \theta) d\theta}{\int_{-90°}^{90°} BL(\theta) \times LC(\theta) \times \text{Dif}(0°, \theta) d\theta} \quad (1)$$

Hereinafter, a specific example will be described with reference to FIGS. 2A through 2I.

Figure 2A:
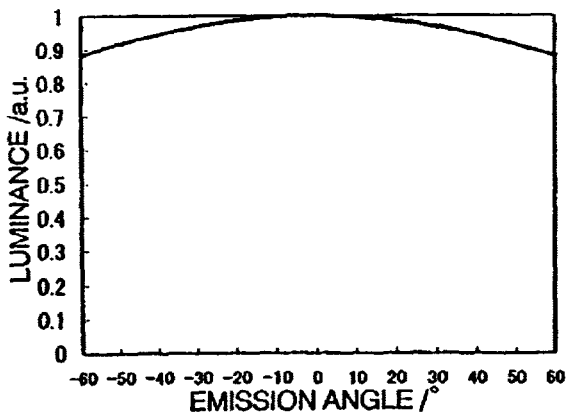
FIGS. 2A and 2B show examples of the luminance characteristic of the back light source.
Figure 2D:
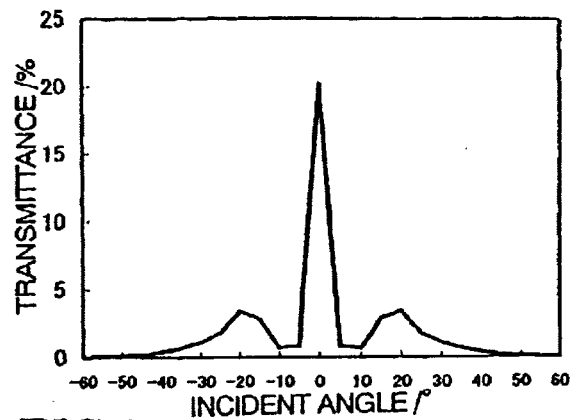
FIGS. 2C and 2D show examples of the optical characteristic of the light diverging element.
Figure 2B:
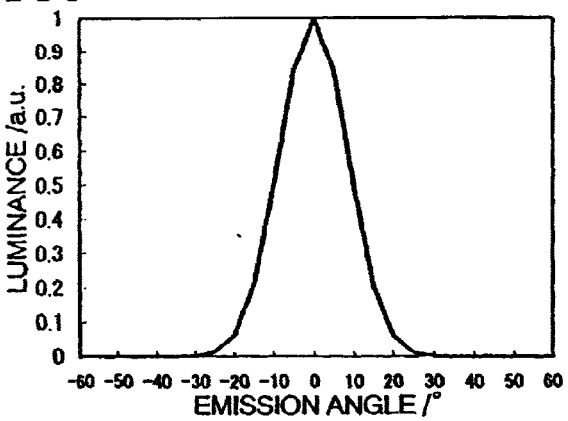
Figure 2E:
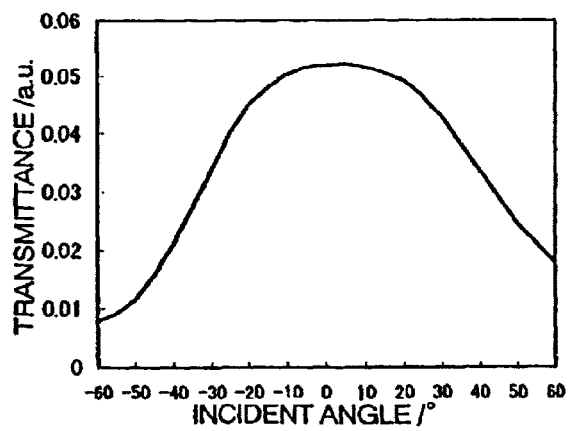
FIG. 2E shows an example of the transmittance characteristic of the liquid crystal display element.
Figure 2C:
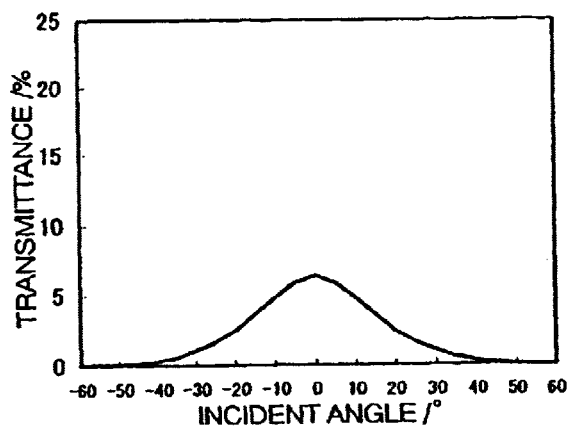

FIG. 2A and FIG. 2B show examples of the luminance characteristic of the back light source 1, FIG. 2C and FIG. 2D show examples of the optical characteristic (light divergence characteristic in this example) of the light diverging element 3, and FIG. 2E shows the transmittance characteristic of the liquid crystal display element 2. As shown in FIG. 2E, the incident angle range at which the liquid crystal display element 2 exhibits transmittance equal to more than half of the maximum transmittance is about 80° (i.e., −35° to 45°).

Figure 2F:
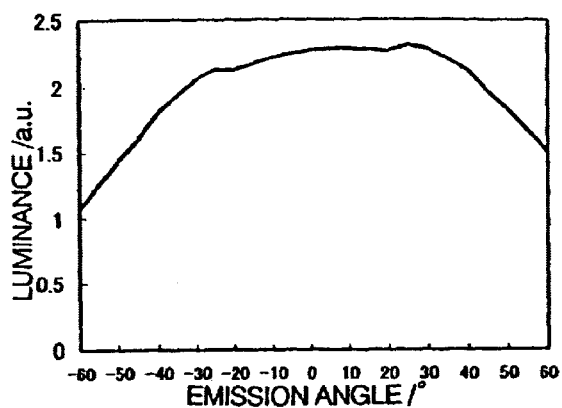
FIGS. 2F, 2G, 2H, and 2I show luminance characteristics of liquid crystal display devices obtained by combining the back light source, the liquid crystal display element, and the light diverging element, specifically showing the luminance characteristics obtained when the back light source having the characteristics shown in FIG. 2A or 2B, the liquid crystal display element having the characteristics shown in FIG. 2E, and the light diverging element having the characteristics shown in FIG. 2C or 2D are combined.
Figure 2H:
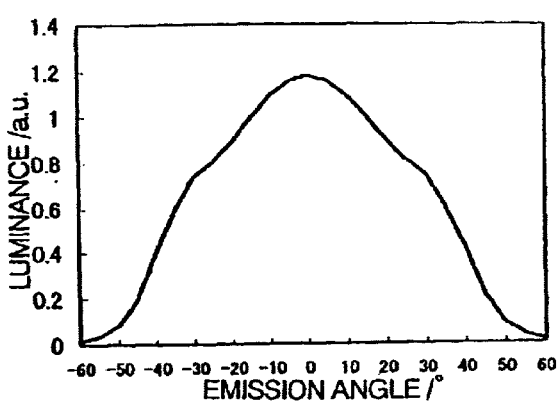
Figure 2G:
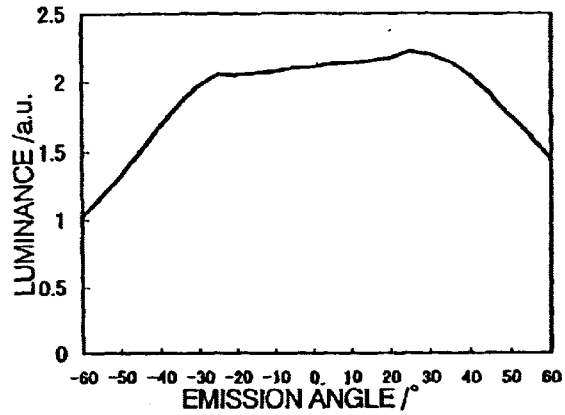
Figure 2I:
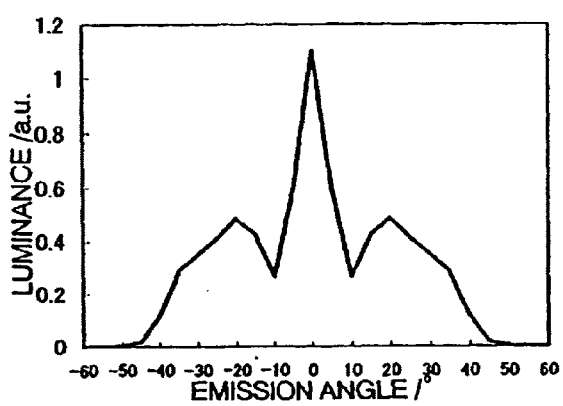

FIGS. 2F, 2G, 2H, and 2I show the luminance characteristics obtained when the back light source having the characteristics shown in FIG. 2A or 2B, the light diverging element having the characteristics shown in FIG. 2C or 2D, and the liquid crystal display element having the characteristics shown in FIG. 2E are combined. Specifically, FIG. 2F corresponds to the combination of the back light source having the luminance characteristic shown in FIG. 2A, that is, the back light source having lower directivity as shown in FIG. 2A—the liquid crystal display element having the transmittance characteristic shown in FIG. 2E—the light diverging element having the light divergence characteristic shown in FIG. 2C. FIG. 2G corresponds to the combination of the back light source having lower directivity as shown in FIG. 2A—the liquid crystal display element having the transmittance characteristic shown in FIG. 2E—the light diverging element having the light divergence characteristic shown in FIG. 2D, that is, the light diverging element having more distortion in light divergence characteristic. FIG. 2H corresponds to the combination of the back light source having higher directivity shown in FIG. 2B—the liquid crystal display element having the transmittance characteristic shown in FIG. 2E—the light diverging element having less distortion in light divergence characteristic shown in FIG. 2C. FIG. 2I corresponds to the combination of the back light source having higher directivity shown in FIG. 2B—the liquid crystal display element having the transmittance characteristic shown in FIG. 2E—the light diverging element having more distortion in light divergence characteristic shown in FIG. 2D.

From the above graphs, it is observed that the luminance of the liquid crystal display device is more distorted when the directivity of light emitted from the back light source (hereinafter, light directivity of the back light source) is higher and the light diverging element has more distortion in characteristic. It is found from these results that distortion in light divergence characteristic is influenced by the light directivity of the back light source and the light divergence characteristic of the light diverging element.

Figure 3:
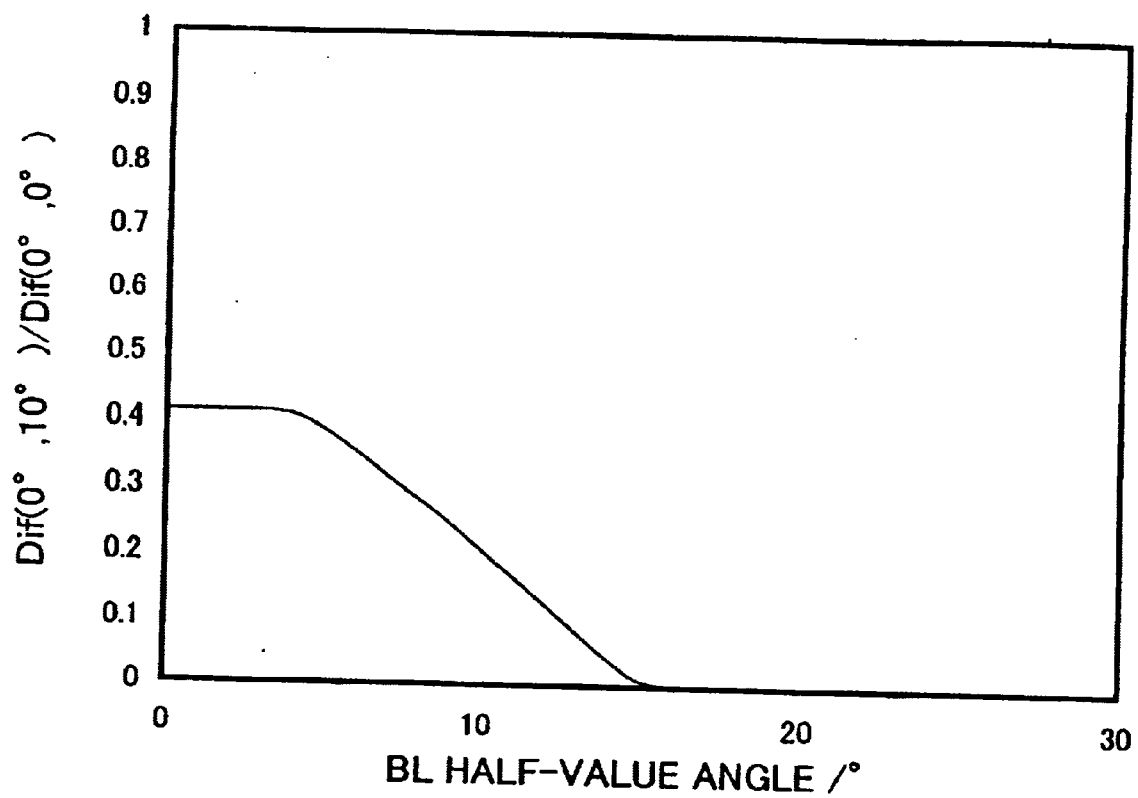
FIG. 3 is a view showing the relationship between the combination of the half-value angle of the back light source (BL half-value angle) and the optical characteristic of the light diverging element and the display quality.

FIG. 3 shows the relationship between the light directivity of the back light source and the light divergence characteristic of the light diverging element for attaining a good luminance characteristic of a panel. In the graph shown in FIG. 3, the range expanding above the solid line is the area in which the luminance characteristic of the liquid crystal display device is good, that is, the area in which expression (1) above is satisfied and good display characteristics are exhibited.

The x-axis of the graph shown in FIG. 3 represents an angle at which the luminance is half of the luminance in the direction of the angle of 0° (herein, this angle is referred to as the "BL half-value angle"). The "BL half-value angle" corresponds to a HWHM (half width at half maximum) of a peak having a maximum at the angle of 0°. The BL half-value angle is a parameter which represents the light directivity of the back light source. The directivity is lower as the value of the BL half-value angle is greater.

The y-axis of the graph shown in FIG. 3 represents the ratio in intensity of light incident at an incident angle of 10° and received from the front (0°) of the panel to light incident at an incident angle of 0° and received from the front (0°) of the panel, that is Dif(0°,10°)/Dif(0°,0°). This ratio represents the light divergence characteristic of the light diverging element. As the value of the ratio is greater, distortion in the light divergence characteristic of the light diverging element is smaller.

In this specification, "distortion in the light divergence characteristic of the light diverging element" represents a dependence of transmittance on the incident angle to the light diverging element. When the transmittance significantly changes depending on the incident angle, distortion of the light diverging element is great. On the other hand, when the transmittance slightly changes depending on the incident angle, distortion of the light diverging element is small.

From FIG. 3, it is found that when the BL half-value angle is greater than about 15°, the light divergence characteristic of the light diverging element does not influence the display quality so greatly. On the contrary, when the BL half-value angle is equal to or less than about 15°, the light divergence characteristic of the light diverging element influences the display quality. As the BL half-value angle is smaller, that is, as the directivity of the back light source is higher, a light diverging element with less distortion in the light divergence characteristic is required. Specifically, from FIG. 3, it is found that by adjusting the optical characteristic of the light diverging element so that the value of Dif(0°,10°)/Dif(0°,0°) is 0.4 or more, good display characteristics is obtained even when the back light source has such high directivity that the BL half-value angle is as small as about 5° or less.

Hereinafter, the light diverging element that can satisfy the conditions described above will be described.

As described above, even when a light diverging element having the most idealistic optical characteristic is successfully produced, the optical characteristic of the light diverging element is inevitably distorted because lens tip portions of the light diverging element are buried in an adhesive layer during the attachment of the light diverging element to an adhesive layer, and the buried portions no more function as the lens. Therefore, in order to provide the liquid crystal display device with a light diverging element having reduced distortion in optical characteristic satisfying the conditions as described above, it is considered effective to narrow the attached area (width of the attached portion) between the light diverging element and the adhesive layer. To satisfy expression (1) above, however, the attached area must be controlled to be extremely narrow. It is difficult to achieve this stably.

To overcome the above problem, in this embodiment, a lens sheet having lens portions serving as the attached portions and lens portions serving as the non-attached portions is used as the light diverging element. Design is made so that the optical characteristic of the entire lens sheet satisfies the conditions described above.

Figure 4:
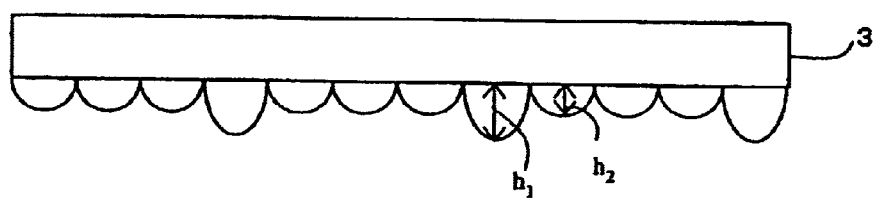
FIG. 4 is a cross-sectional view of a lenticular lens sheet with unit lenses having different heights.
Figure 5:
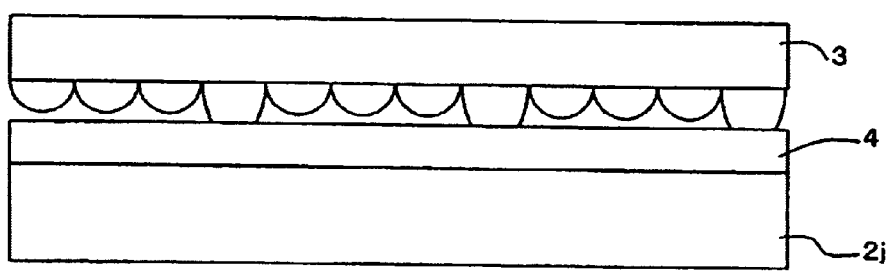
FIG. 5 is a cross-sectional view showing a main portion of a schematic structure of a second polarizing element, an adhesive layer, and the lens sheet with unit lenses having different heights.

FIG. 4 shows an example of a lens sheet 3 as a light diverging element suitably used for the liquid crystal display device of the present invention. The lens sheet 3 is a lenticular lens sheet with unit lenses having different heights as shown in FIG. 4. Lens units having a relatively large height ($h_1$) serve to attach the lens sheet 3 to a second polarizing element 2j shown in FIG. 5 via an adhesive layer 4 formed on the front side (viewer's side) of the second polarizing element 2j. The other lens units having a relatively small height ($h_2$ (<$h_1$)) are preferably in substantially no contact with the adhesive layer 4.

The attached portions (portions where the unit lenses having a relatively large height ($h_1$) are formed) and the non-attached portions (portions where the unit lenses having a relatively small height ($h_2$) are formed) have different optical characteristics from each other. Therefore, the optical characteristic of the entire lens sheet is obtained by superposing the optical characteristic of the attached portions and that of the non-attached portions on each other. This indicates that by changing the ratio (in area) of the attached portions to the non-attached portions, the optical characteristic of the light diverging element 3 can be controlled. Thus, it is comparatively easy to attain the light diverging element 3 satisfying expression (1) above.

More specifically, the optical characteristic of the entire lens sheet is expressed by $n \times g(a, \theta) + (1-n) \times f(a, \theta)$ where $g(a, \theta)$ is the optical characteristic of the unit lenses in the attached portions, n is the proportion (in area) of the attached portions to the entire lens sheet, $f(a, \theta)$ is the optical characteristic of the unit lenses in the non-attached portions, and 1−n is the proportion of the non-attached portions to the entire lens sheet. If expression (1) is satisfied when the above optical characteristic of the entire lens sheet is substituted for Dif(a, $\theta$) in expression (1), a liquid crystal display device with good quality is attained.

Figure 6:
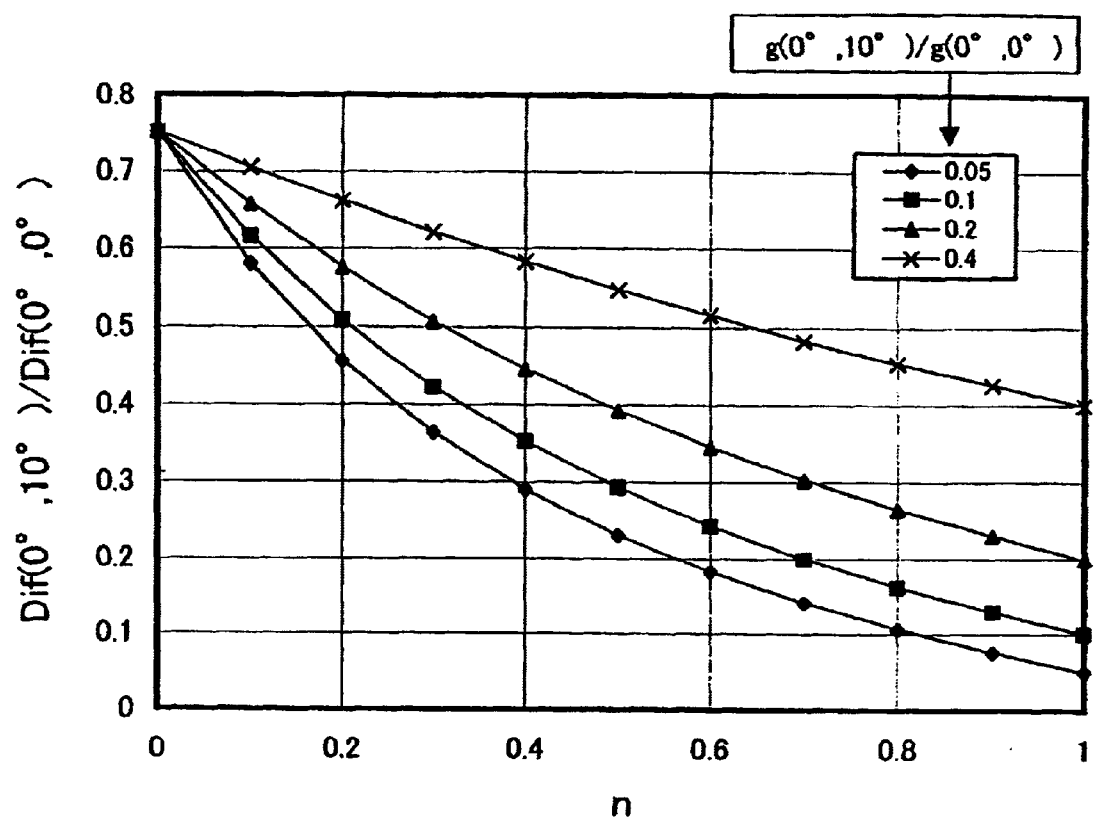
FIG. 6 is a graph showing how the optical characteristic of the entire lens sheet shown in FIG. 4 changes depending on the optical characteristic of the lens attached portions and the proportion n of the lens attached portions, where the y-axis represents Dif(0°, 10°)/Dif(0°, 0°) as the optical characteristic of the entire lens sheet and the x-axis represents the proportion n.

FIG. 6 specifically shows how the optical characteristic of the entire lens sheet change depending on the optical characteristic of the unit lenses in the attached portions and the proportion n. The y-axis of the graph shown in FIG. 6 represents Dif(0°,10°)/Dif(0°,0°) as the optical characteristic of the entire lens sheet, and the x-axis represents the proportion n. Note that the equation Dif(a, $\theta$)=$n \times g(a, \theta) + (1-n) \times f(a, \theta)$ has been established in this graph.

The value of Dif(0°,10°)/Dif(0°,0°) is determined depending on the BL half-value angle of the back light source. As is seen from FIG. 3, when the BL half-value angle is 10°, Dif(0°,10°)/Dif(0°,0°) is desirably 0.2 or more.

When the optical characteristic $g(0°,10°)/g(0°,0°)$ of the unit lenses in the attached portions has already been determined, the optical characteristic Dif(0°,10°)/Dif(0°,0°) of the entire lens sheet can be controlled by adjusting the proportion n. Assume that the optical characteristic $g(0°, 10°)/g(0°,0°)$ of the unit lenses in the attached portions is 0.1. Then, from FIG. 6, it is found that Dif(0°,10°)/Dif(0°, 0°) can be 0.2 or more when n≦0.7.

If the lens sheet as shown in FIG. 4 is adopted, the optical characteristic of the entire lens sheet, that is, the value of Dif(0°,10°)/Dif(0°,0°) can be made large by appropriately selecting the proportion n even when the optical characteristic g(0°,10°)/g(0°,0°) of the unit lenses in the attached portions is small (for example, 0.05).

On the contrary, if a conventional lens sheet (n=1) with unit lenses having substantially the same height is adopted, it is necessary to increase the value of g(0°,10°)/g(0°,0°) (for example, to 0.2 or more) as is seen from FIG. 6. To attain this, the lens sheet must be attached to an adhesive layer so that the contact regions between lens tip portions and the adhesive layer are extremely small. This is practically impossible. As a result, using the conventional lens sheet, it is difficult to satisfy expression (1).

Next, the liquid crystal display device of an embodiment of the present invention will be described in comparison with a conventional liquid crystal display device. It should be noted that the construction of the liquid crystal display device of the present invention is not limited to that described hereinafter.

Figure 7:
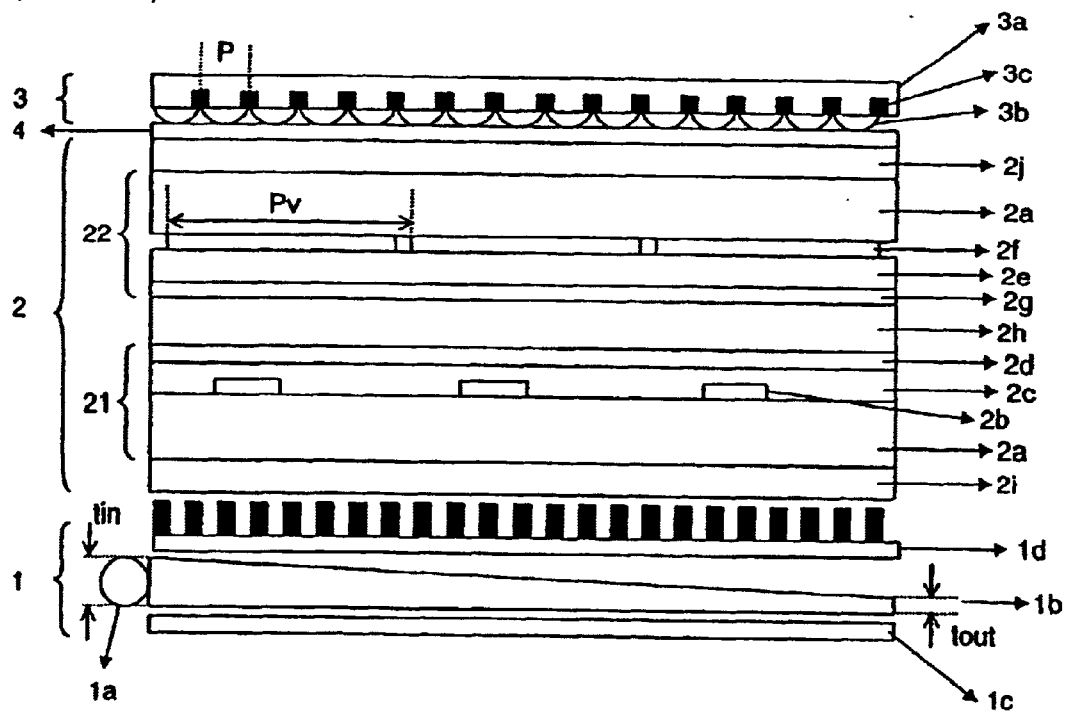
FIG. 7 is a schematic cross-sectional view showing a main portion of a conventional liquid crystal display device.

First, a conventional liquid crystal display device shown in FIG. 7 will be described. The conventional liquid crystal display device includes a back light source 1, a liquid crystal display element 2, and a light diverging layer 3. The back light source 1 essentially includes a light guiding member 1b for outputting light emitted from a cold cathode fluorescent lamp 1a to a plane uniformly, a diffuse reflector sheet 1c for reflecting light traveling to the back of the device toward the front outgoing surface, and a louver sheet 1d for converging the emitted light.

The liquid crystal display element 2 includes: an active matrix substrate 21 having matrix-shaped thin film transistors (TFTs) 2b, a transparent electrode 2c, and an alignment film 2d formed on a transparent glass substrate 2a; a color filter substrate 22 having a transparent electrode 2e, color filters 2f, and an alignment film 2g; and a liquid crystal layer 2h including a twisted nematic (TN) liquid crystal material having a twist angle of about 90 degrees sealed between the transparent substrates 21 and 22. The liquid crystal material has dielectric constant anisotropy. A pair of polarizing plates 2i and 2j are placed sandwiching the transparent substrates 21 and 22.

The light diverging layer 3 is a lenticular lens sheet having the lens effect on one side. The light diverging layer 3 essentially includes a lens support 3a, lens portions 3b, and light absorbing layers 3c for preventing retroreflection. The light diverging layer 3 is placed on the outer surface of the polarizing plate 2j on the viewer's side via an adhesive layer 4, and diverges the output light from the liquid crystal display element 2. As the liquid crystal display element 2, used was that having a screen size of 15 inches in a diagonal line (228.6 mm×304.8 mm), a stripe array with the number of pixels of 640 (each of R, G, B) horizontally×480 vertically, and a horizontal pixel pitch of about 0.159 mm and a vertical pixel pitch Pv of about 0.476 mm. The direction in which the lenticular lens sheet is placed is determined depending on the purpose. For example, when it is desired to widen the viewing angle in the vertical directions, the lens sheet is placed so that the direction in which the unit lenses of the lens sheet extend is horizontal with respect to the screen of the liquid crystal display element.

Modulation control elements for changing the orientation state of liquid crystal molecules are provided in connection with the transparent electrodes. The orientation state of liquid crystal molecules is controlled with an electric field as an external field generated by a display voltage applied, to thereby control modulation of the light intensity.

Figure 8:
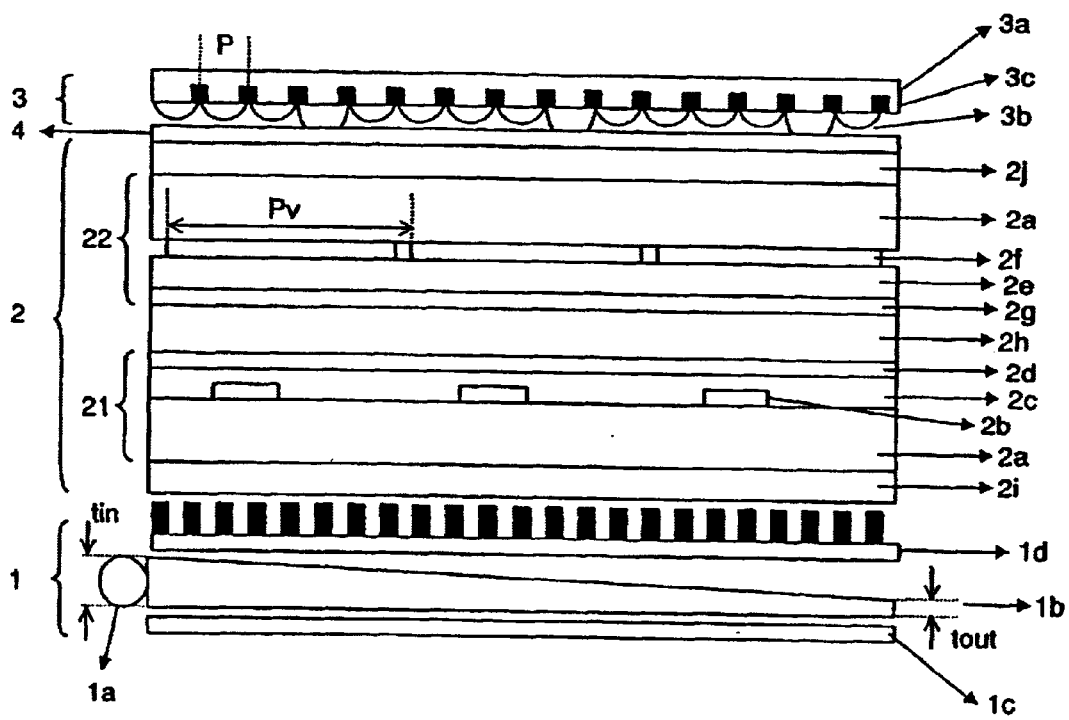
FIG. 8 is a schematic cross-sectional view showing a main portion of a liquid crystal display device of an embodiment of the present invention.

Next, the liquid crystal display device of the embodiment of the present invention shown in FIG. 8 will be described. The liquid crystal display device of this embodiment is different from the conventional liquid crystal display device shown in FIG. 7 in the following point. The lenticular lens sheet 3 has first unit lenses (height: 0.025 mm, for example) and second unit lenses having a height smaller than the first unit lenses (height: 0.015 mm, for example). Only the unit lenses having the larger height are in contact with the adhesive layer 4. The other construction is the same as that shown in FIG. 7, and therefore the description thereof is omitted here.

The fabrication method for the liquid crystal display device of this embodiment will be described. First, interconnections, electrodes, and color filters are formed on the transparent substrates 21 and 22. In this embodiment, glass plates having a thickness of 0.5 mm (Glass Code 7059, manufactured by Corning Glass Works) were used as the transparent substrates 21 and 22, and ITO films were deposited by sputtering to form the transparent electrodes. Known methods can be employed for formation of lines, electrodes, and color filters. Therefore, detailed description on these methods is omitted here. In this embodiment, color filters are formed on the substrate 22 on which counter electrodes are formed. Alternatively, color filters may be formed on the substrate 21, not on the substrate 22.

As the alignment films, polyimide alignment films are formed by printing, baked at 180° C., and then subjected to rubbing. The thus-formed alignment films have a twist angle of 90 degrees. Thereafter, to keep constant the distance between the substrates for the liquid crystal layer 2h, glass fiber spacers having a diameter of 4.5 µm are scattered. Also, as a liquid crystal sealing layer, an adhesive sealing member containing glass fiber spacers having a diameter of 5.3 µm is formed by screen printing, and the two substrates are attached together. The liquid crystal material is then injected into the space between the two substrates by vacuum deaeration, to form the TN liquid crystal cell. The polarizing plates 2i and 2j having a thickness of 0.25 mm are then formed. An ultraviolet-curable acrylic adhesive is then formed on the polarizing plate 2j. The light diverging layer 3 is attached to the adhesive, and then the adhesive is irradiated with ultraviolet light to cure the resin.

The light diverging layer 3 was formed in the following manner. An ultraviolet-curable resin (Z9001, refractive index n=1.59) manufactured by JSR Co., Ltd (Japanese company) was injected into a mold in a shape of repeated concave portions. The ultraviolet-curable resin was then irradiated with 1.0 J/cm² ultraviolet light, to be cast to form a lens sheet having repeated convex portions. As the lens support 3a, an ARTON film manufactured by JSR Co., Ltd. was used. The formation method of the lens sheet is not limited to that described above, but the lens sheet may be formed on a transparent substrate utilizing thermal sagging of a resist film or injection molding of an acrylic resin. Otherwise, it may be formed on a glass substrate utilizing ion exchange or glass etching. The lenticular lens sheet was formed by repeatedly forming unit lenses having different heights so as to extend in parallel with the horizontal direction of pixels of the liquid crystal element 2 at a pitch P of 0.06 mm, a height of longer unit lenses of 0.025 mm, a height of shorter unit lenses of 0.015 mm (a ratio of the shorter height to the longer height is 3/5), and a focal distance of about 0.25 mm. The area proportion n of the unit lenses in the attached portions was about 0.2.

In this embodiment, the unit lenses of the lenticular lens sheet extend in parallel with the horizontal direction of the screen of the liquid crystal element 2. The placement of the unit lenses is not limited to this, but may be in parallel with the vertical direction of the screen of the liquid crystal element 2. The light diverging element to be placed is not limited to the lenticular lens sheet, but a microlens array having a number of semispherical microlenses may be placed.

The back light source 1 essentially includes the cold cathode fluorescent lamp 1a, the light guiding member 1b, the diffuse reflector sheet 1c, and the louver sheet 1d. The light guiding member 1b is of a wedge shape having a thickness at the incident face $t_{in}=4$ mm and a thickness at the opposing face $t_{out}=2$ mm. The surface opposite to the light outgoing surface of the light guiding member 1b is subjected to grain printing, and near this surface, the diffuse reflector sheet 1c is placed. As the louver sheet 1d near the light outgoing surface of the light guiding member 1b, a louver sheet manufactured by Sumitomo 3M Ltd. was used.

The display characteristics of the liquid crystal display device of this embodiment of the present invention fabricated in the manner described above and those of the conventional liquid crystal display device were evaluated by measuring the ratio between the front luminance and the luminance at 10° from the front. The results are shown in Table 1 below.

TABLE 1

| | BL half-value angle of back light source | Dif (0°, 10°)/ Dif (0°, 0°) of light divergence element | LC (10°)/ LC (0°) of liquid crystal display device | Visual recognition |
| --- | --- | --- | --- | --- |
| Prior art 1 | 5° | 0.34 | 0.4 | Bad |
| Prior art 2 | 10° | 0.1 | 0.35 | Bad |
| invention 1 | 5° | 0.45 | 0.6 | Good |
| invention 2 | 10° | 0.34 | 0.7 | Good |

Thus, it was confirmed that according to the present invention, even when the back light source having higher directivity was used, good display characteristics were attained by designing the back light source and the light diverging element so that the directivity of the back light source, the light divergence characteristic of the light diverging element, and the transmittance characteristic of the liquid crystal display element satisfied expression (1).

In the embodiment described above, the light diverging element (light diverging layer 3) was attached to the polarizing plate 2j. The present invention is not limited to this construction. The light diverging element may be directly attached to a transparent substrate constituting a liquid crystal display element having no polarizing plate, or may be attached to an optical member (optical film) other than a polarizing plate. Otherwise, the light diverging element may be fixed to a transparent support or the like to form a laminate film, and the laminate film may be attached to the liquid crystal display element.

Thus, as described above, the liquid crystal display device of the present invention, in which the light diverging element is held via an adhesive layer, improves in the luminance at ±10° from the front with respect to the front luminance even when the directivity of the back light source is high, and thus can exhibit excellent display quality.

Hereinafter, the viewing angle characteristics of the liquid crystal display device of the embodiment according to the invention will be described in comparison with a liquid crystal display device (comparative example) shown in FIG. 8, which has the same structure as the liquid crystal display device of the embodiment except that it does not have a diverging layer 3 of the liquid crystal display device of the embodiment. Both of the liquid crystal display devices of the embodiment and the comparative example include the liquid crystal element 2 shown in FIG. 2E.

Figure 9A:
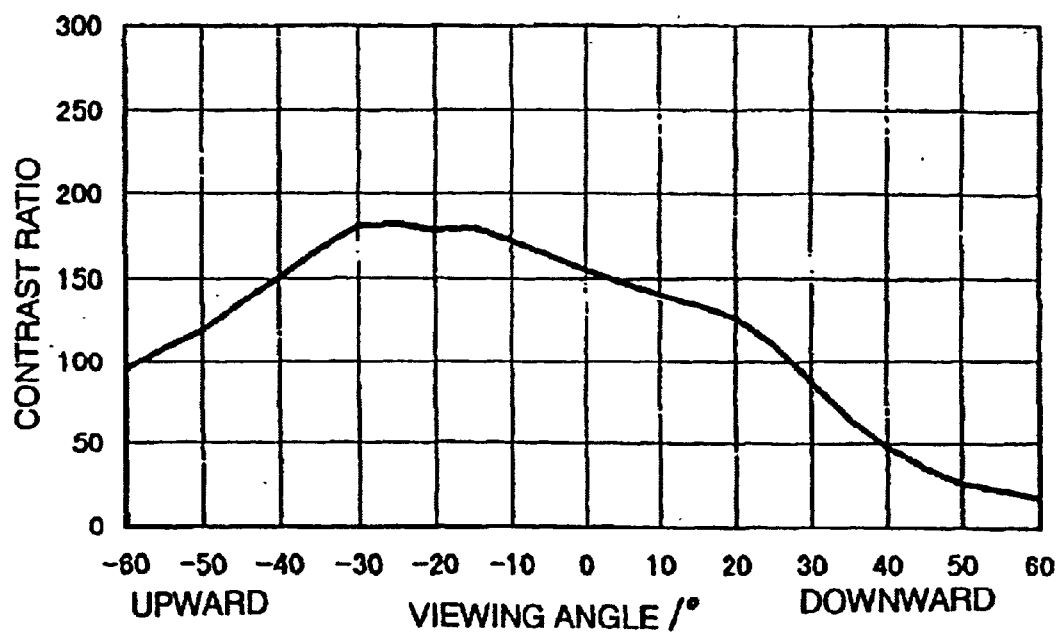
FIG. 9A is a graph showing the dependence of a contrast ratio on a viewing angle of the liquid crystal display device of the embodiment.
Figure 10A:
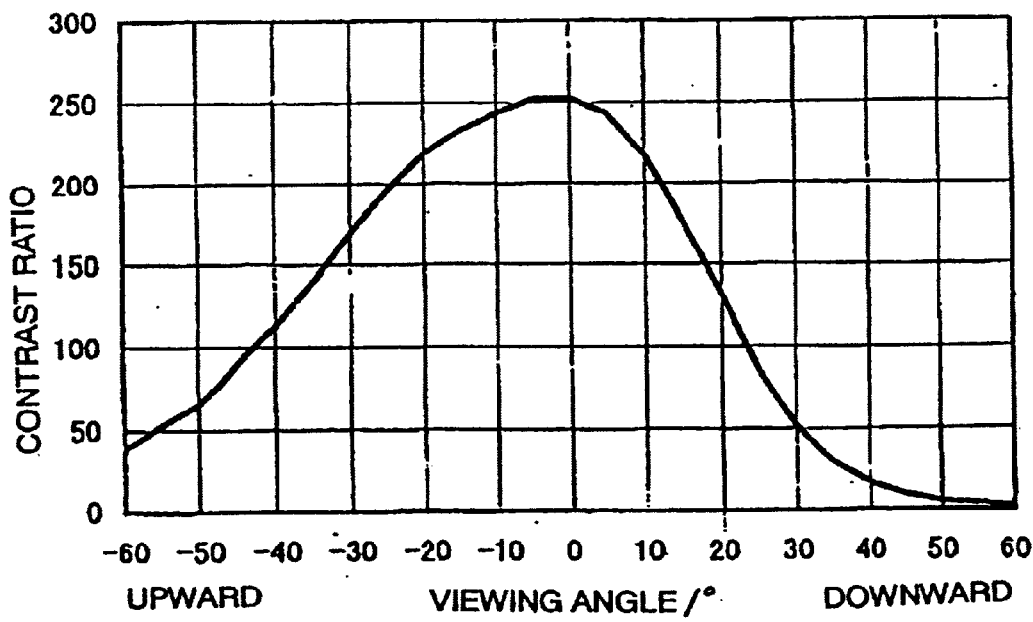
FIG. 10A is a graph showing the dependence of a contrast ratio on a viewing angle of the liquid crystal display device of the comparative example.

At first, the dependence of a contrast ratio on a viewing angle will be described with reference to FIGS. 9A and 10A. FIGS. 9A and 10A are graphs showing the dependence of a contrast ratio on a viewing angle for the liquid crystal display devices of the embodiment and the comparative example, respectively. As shown in FIG. 10A, the viewing angle range at which the comparative example exhibits a contrast ratio equal to or more than 100 is only about 66° (−43 to 23 ). On the other hand, as shown in FIG. 9A, the viewing angle range at which the embodiment exhibits a contrast ratio equal to or more than 100 is about 86° (−58° to 28°). Accordingly, it is understood that the dependence of a contrast ratio on the viewing angle of the liquid crystal display device is decreased by providing the diverging layer 3.

Figure 9B:
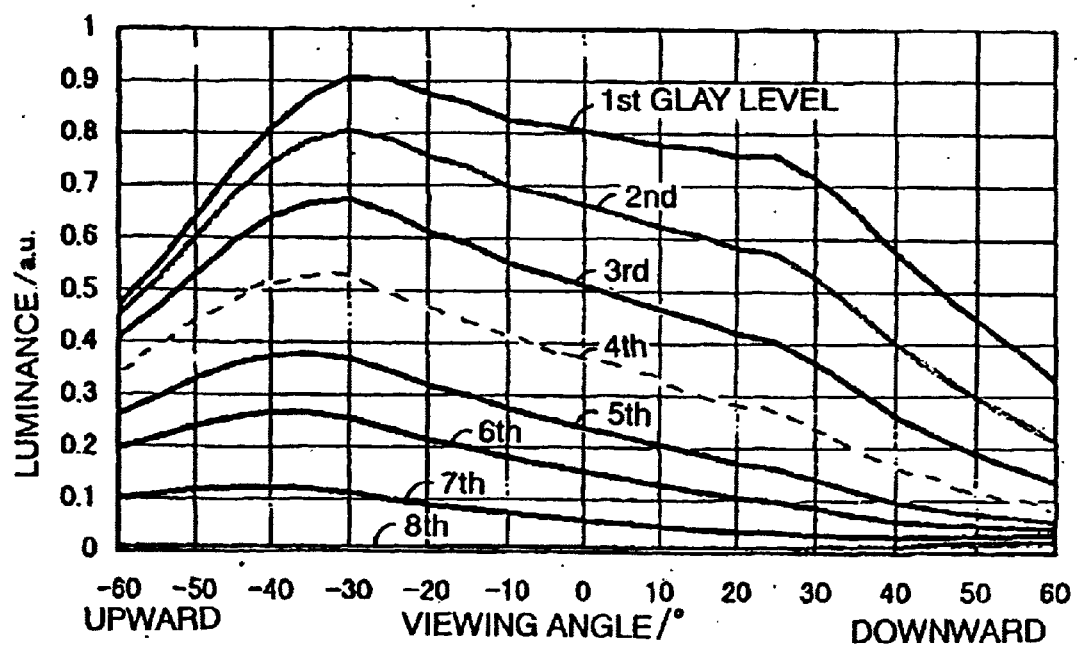
FIG. 9B is a graph showing the dependence of luminance on the viewing angle at each of the gray levels of the liquid crystal display device of the embodiment.
Figure 10B:
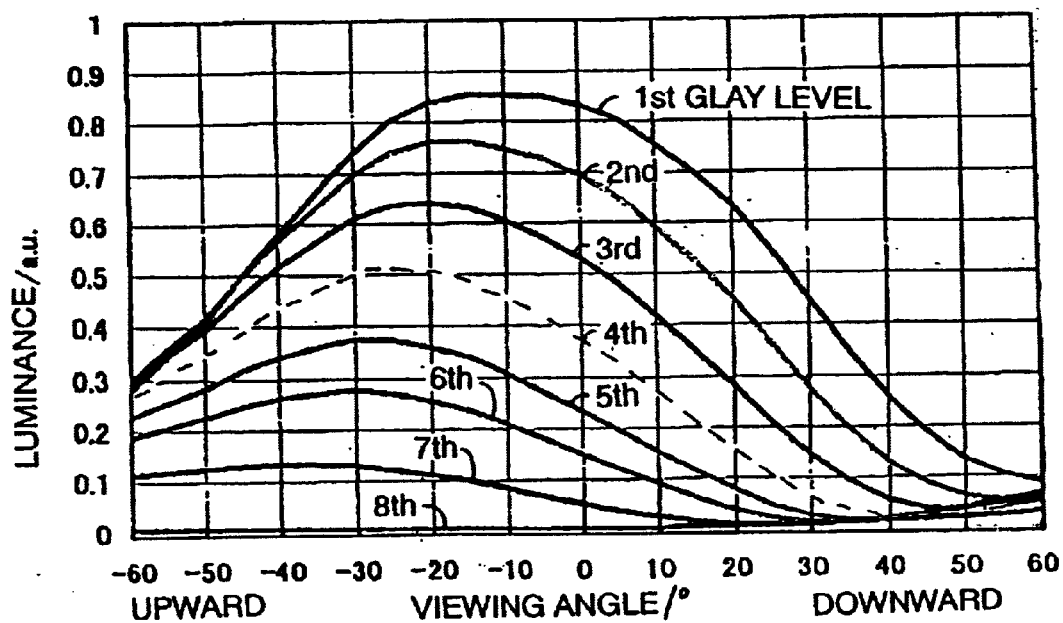
FIG. 10B is a graph showing the dependence of luminance on the viewing angle at each of the gray levels of the liquid crystal display device of a comparative example.

Next, with reference to FIGS. 9B and 10B, the dependence of luminance at each of the gray scale levels on the viewing angle will be described. FIGS. 9B and 10B are graphs showing the dependence of luminance on the viewing angle at each of the gray levels for the liquid crystal display devices of the embodiment and the comparative example, respectively.

As shown in FIG. 10B, the liquid crystal display device of the comparative example shows a gray scale-inversion within the ranges of −50° to −60° and 40° to 60° of the viewing angle. The gray scale-inversion means a phenomenon that the luminance does not increase sequentially in the order of gray levels (8, 7, 6, 5, 4, 3, 2, 1,). On the other hand, the liquid crystal display device of the embodiment does not show the gray scale-inversion within the whole rage of the measurement. Accordingly, it is confirmed that the gray scale-inversion is prevented from occurring by providing the diverging layer 3.

Furthermore, according to the embodiment of the invention, the dependence of a luminance on a viewing angle of the liquid crystal display device is also decreased as shown in FIGS. 2F, 2G, or 2H. The luminance of the liquid crystal display devices of the embodiment changes less than 0.5, while the viewing angle changes 10°. On the other hand, the luminance of the conventional liquid crystal display device including a conventional light diverging element with distortion changes dramatically depending on a viewing angle as shown in FIG. 2I. The luminance changes more than 0.5, while the viewing angle changes 10°. Accordingly, it is understood that the angular dependence of the luminance of the liquid crystal display devices of the embodiment is improved.

The lens sheet according to the present invention is less distorted in optical characteristics after being attached to an optical member via an adhesive layer. This enables improvement in the luminance at ±10° from the front with respect to the front luminance even when the lens sheet is placed in front of the liquid crystal display device including a back light source having high directivity.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A transmission type liquid crystal display device comprising:
a liquid crystal display element including a pair of transparent insulating substrates placed to face each other with a gap therebetween, transparent electrodes being formed on inner surfaces of the substrates, and a liquid crystal material injected in the gap;
a light source placed on a back side of the liquid crystal display element; and
a light diverging element placed on a front side of the liquid crystal display element,
wherein the liquid crystal display device satisfies an expression $$0.5 \leq \frac{\int_{-90°}^{90°} BL(\theta) \times LC(\theta) \times \mathrm{Dif}(10°, \theta) d\theta}{\int_{-90°}^{90°} BL(\theta) \times LC(\theta) \times \mathrm{Dif}(0°, \theta) d\theta}$$

where $BL(\theta)$ is a light emitting angle $\theta$—luminance characteristic of the light source, $LC(\theta)$ is an incident angle $\theta$ to the liquid crystal display element—transmittance characteristic of the liquid crystal display element in a bright state, and $\mathrm{Dif}(a, \theta)$ is an incident angle $\theta$ to the light diverging element—transmittance characteristic of the light diverging element at a light receiving angle a.

2. The liquid crystal display device of claim 1, wherein the expression is satisfied by adjusting the $BL(\theta)$ and the $\mathrm{Dif}(a, \theta)$.

3. The liquid crystal display device of claim 1, wherein an adhesive layer is formed between the light diverging element and the liquid crystal display element,
the light diverging element is a lens sheet including first unit lens portions with convex portions having a first height and second unit lens portions with convex portions having a second height smaller than the first height, and
the lens sheet is attached to the adhesive layer at the first unit lens portions.

4. The liquid crystal display device of claim 3, wherein the first unit lens portions of the lens sheet are attached to the adhesive layer, while the second unit lens portions are away from the adhesive layer, and
the lens sheet has an optical characteristic of $\mathrm{Dif}(a, \theta) = n \times g(a, \theta) + (1-n) \times f(a, \theta)$ where $g(a, \theta)$ is an optical characteristic of the first unit lens portions, n is a proportion in area of the first unit lens portions to an entire lens sheet, $f(a, \theta)$ is an optical characteristic of the second unit lens portions, and $1-n$ is a proportion in area of the second unit lens portions to the entire lens sheet.

5. The liquid crystal display device of claim 1, wherein the light source has directivity that a light emitting angle at which a luminance is a half of the luminance in a direction normal to a front surface of the liquid crystal display element is 15° or less.

6. The liquid crystal display device of claim 5, wherein the light source has directivity that a light emitting angle at which a luminance is a half of the luminance in the direction normal to the front surface of the liquid crystal display element is 5° or less, and
the light diverging element has an optical characteristic that $\mathrm{Dif}(0°, 10°)/\mathrm{Dif}(0°, 0°)$ is 0.4 or more.

7. A transmission type liquid crystal display device comprising:
a liquid crystal display element including a pair of transparent insulating substrates placed to face each other with a gap therebetween, at least one transparent electrode being formed on an inner surface of each of the substrates, and a liquid crystal material provided in the gap;
a light source placed on a back side of the liquid crystal display element; and
a lens sheet placed on a front side of the liquid crystal display element via an adhesive layer, the lens sheet comprising:
first unit lens portions with convex portions having a first height, and a second unit lens portions with convex portions having a second height smaller than the first height, wherein both of the convex portions having the first height and the convex portions having the second height face the adhesive layer, and wherein the first unit lens portions are attached to the adhesive layer, while the second unit lens portions are spaced away from the adhesive layer,
wherein the light source has directivity that a light emitting angle at which a luminance is a half of the luminance in the direction normal to the front surface of the liquid crystal display element is 5° or less, and the lens sheet has an optical characteristic that $\mathrm{Dif}(0°, 10°)/\mathrm{Dif}(0°, 0°)$ is 0.4 or more when $\mathrm{Dif}(a, \theta)$ is an incident angle $\theta$ to the lens sheet-transmittance characteristic of the lens sheet at a light receiving angle a.

8. The liquid crystal display device of claim 7, wherein a ratio of the second height to the first height is 3/5 and a proportion in area of the first unit lens portions to an entire lens sheet is about 0.2.

9. The liquid crystal display device of claim 7, wherein the light source has directivity that a light emitting angle at which a luminance is a half of the luminance in a direction normal to a front surface of the liquid crystal display element is 15° or less.

10. A lens sheet attached to a front side of a liquid crystal display element via an adhesive layer, the lens sheet comprising:
first unit lens portions with convex portions having a first height, and
second unit lens portions with convex portions having a second height smaller than the first height,
wherein both of the convex portions having the first height and the convex portions having the second height face the adhesive layer at the front side of the liquid crystal display element,
wherein the lens sheet has an optical characteristic that $\mathrm{Dif}(0°, 10°)/\mathrm{Dif}(0°, 0°)$ is 0.4 or more when $\mathrm{Dif}(a, \theta)$ is an incident angle $\theta$ to the lens sheet-transmittance characteristic of the lens sheet at a light receiving angle a.

11. The lens sheet of claim 10, wherein a ratio of the second height to the first height is 3/5 and a proportion in area of the first unit lens portions to an entire lens sheet is about 0.2.

* * * * *